United States Patent
Van Popta

[15] 3,646,588
[45] Feb. 29, 1972

[54] DEVICE FOR MAKING PREDICTIONS AND CORRECTIONS FROM RADAR DATA

[72] Inventor: Yftinus Frederik Van Popta, Hengelo, Netherlands

[73] Assignee: N. V. Hollandse Signaalapparaten, Hengelo, Netherlands

[22] Filed: Oct. 13, 1969

[21] Appl. No.: 865,583

[30] Foreign Application Priority Data

Oct. 18, 1968 Netherlands..........................6814192

[52] U.S. Cl............................................343/7.3, 343/5 DP
[51] Int. Cl................................................................G01s 9/14
[58] Field of Search..........................................343/5 DP, 7.3

[56] References Cited

UNITED STATES PATENTS 3,503,068 3/1970 Yamauchi..........................343/5 DP X
3,539,978 11/1970 Stedtnitz..............................343/7.3 X Primary Examiner—T. H. Tubbesing
Attorney—Frank R. Trifari

[57] ABSTRACT

A device for making predictions and corrections in azimuth and a given second coordinate (particularly the range) of a target to be tracked from video signals detected by a pulse radar apparatus. In such a device a varying number of bits is written in a buffer register for each detected video signal. The number of storage elements of that register correspond with the number of increments into which the measuring range is divided. These increments are shorter than the pulse duration. The contents of the register are placed in the store of a computer during each transmitter pulse interval. The real target position is obtained by selection of a group of bits from the total of bit positions as written in the store during consecutive transmitter pulse intervals and by logically processing said group of bits.

3 Claims, 8 Drawing Figures

DEVICE FOR MAKING PREDICTIONS AND CORRECTIONS FROM RADAR DATA

The invention relates to a device for making predictions and corrections in azimuth and a given second coordinate of a target to be tracked from video signals detected by a pulse radar apparatus, and written via a quantizer and a buffer register into the store of an electronic digital computer, the buffer register being divided into a number of storage elements, said number corresponding to a given division of the desired measuring range for determining said second target coordinate, the computer being programmed so that the real position of the target to be tracked is determined from the recorded data. Such a device is known and is employed in search radar apparatus for automatically tracking one or more targets in range and azimuth. The range increments have such a value, i.e., at least equal to the duration of the transmitter pulse, that during the time a target is scanned by the radar beam a single sequence of video signals is written into the store. In such a case accurate range measurement is not possible.

The invention has for its object both to obviate this difficulty and to improve the resolving power, i.e., the distinction between echoes of targets and interferences, the relative distance of which may be shorter than the duration of the transmitter pulse. The invention furthermore provides such an embodiment of the device set forth that the possibility of use is not restricted to search radar apparatus for tracking one or more targets in range and azimuth but can also be used in three-dimensional radar system for the accurate determination of both range, azimuth and elevation.

According to the invention each of the increments into which said measuring range is divided is shorter than the pulse duration, whilst the quantizer is constructed so that in each transmitter pulse interval a varying number of bits is written in the buffer register for each video signal from the targets located within the desired measuring range and the real target position in azimuth and said second coordinate is obtained by the selection of the group of bits associated with the target to be tracked from the total of bit positions as written in the store of the computer during consecutive transmitter pulse intervals and by logically processing said group of bits.

The invention and its advantages will be described more fully with reference to the figures, of which FIG. 1 shows block diagrammatically the principle of the device according to the invention in a search radar apparatus;

Like parts in the figures are designated by like reference numerals.

Figure 1:
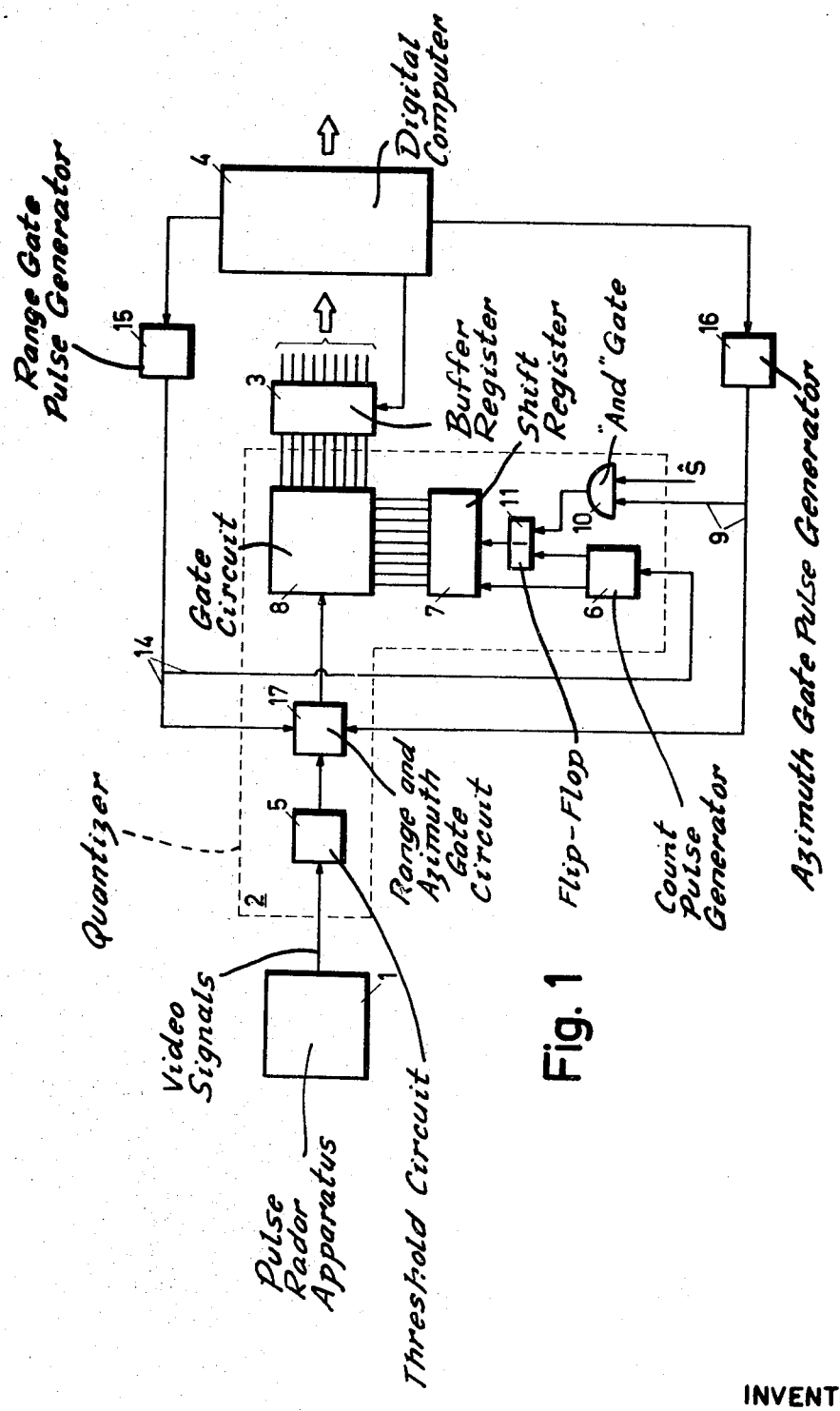
Figure 3:
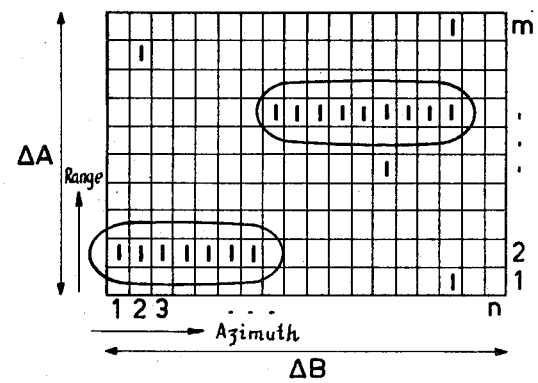

In the block diagram of FIG. 1, in which the device according to the invention is employed in a search radar apparatus, reference numeral 1 designates a pulse radar apparatus, in which the video signals appearing at the output are written through a quantizer 2 and a buffer register 3 into the store of an electronic digital computer 4. Buffer register 3 is divided into a number of storage elements, which number corresponds to a given division of the desired measuring range in range increments. Each of the storage elements is therefore related to a given range interval. If each of the range increments is longer than or equal to the duration of a transmitter pulse as is the case with prior art devices, each video signal is in general represented by setting that storage element of the buffer register which corresponds to the range interval in which the target providing the video signal is located. In that case only those video signals are considered which exceed a given threshold value; the quantizer 2 is provided for this purpose with a threshold circuit 5. The contents of the buffer register are thus recorded for each pulse transmitted within the desired azimuth interval and taken over in the store of the computer 4. In order to obtain a correct insight the information thus obtained in the store may be displayed in an array of rows and columns, hereinafter termed "bit array." The diagram of FIG. 3 illustrates such a bit array. The dimensions of the bit array are determined by the desired measuring range $\Delta A$ and azimuth interval $\Delta B$; the number of columns $n$ of the bit array corresponds with the number of pulses transmitted within the desired azimuth interval, the number of rows $m$ corresponds to the number of distance increments into which the desired measuring range is divided. The bit array is thus divided into $n \times m$ squares. If the radar beam sweeps a target, the resultant signals received are represented in the bit array by a single sequence of bits, one bit being indicated in each square. In FIG. 3 two targets are outlined. The other bits indicated in the figure have to be considered as interference signals. It will be obvious that in this way the accuracy of range measurement and the resolving power are determined by the size of the range increments.

According to the invention the quantizer 2 is constructed so that when the measuring range is divided into increments, each of which is shorter than the duration of the transmitter pulse, a varying number of bits are written in register 3 in each transmitter pulse interval for each video signal from the targets located inside the desired measuring range and that the real target position in azimuth and range is obtained by the selection of the group of bits associated with the target to be tracked from the total of bit positions as written during consecutive transmitter pulse intervals in the store of the computer 4 and by logically processing said group of bits.

Figure 2:
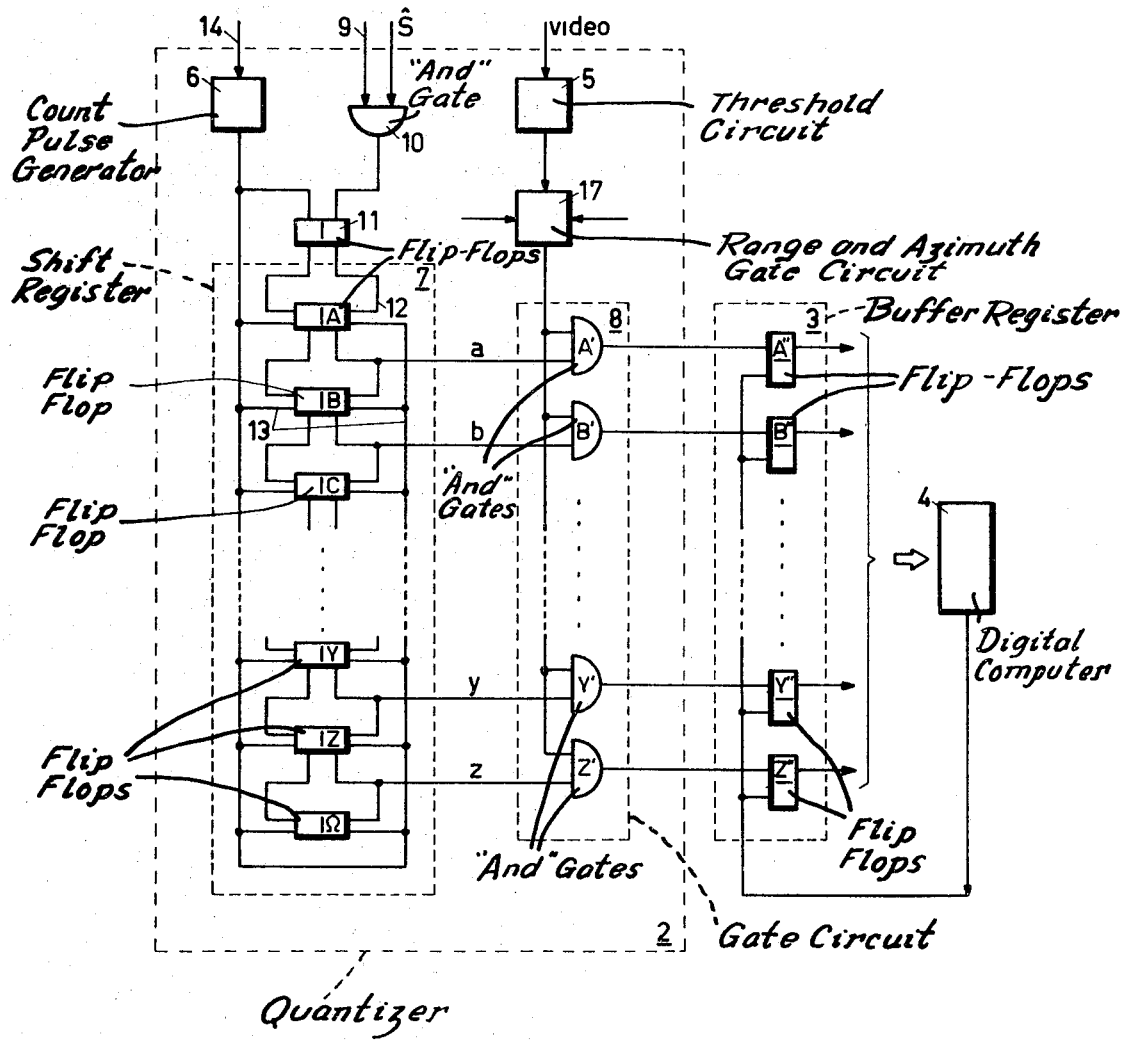
FIG. 2 shows one embodiment of said device.

For this purpose the quantizer 2, as shown in detail in FIG. 2, comprises a count pulse generator 6, a shift register 7, comprising flip-flop circuits A, B, .... and a gate circuit 8, comprising the "AND"-gates A', B', .....

During the time when the radar aerial passes through the desired azimuth interval and the "AND"-gate 10 remains opened by a signal fed through conductor 9, sync pulses $S$ are fed synchronously with the pulse repetition frequency through gate 10 and via flip-flop 11 and R-input 12 ("gate" input) to the A flip-flop of the shift register. Each time when a sync pulse $S$ is fed to quantizer 2 the contents of the shift register are determined so that all "AND" gates of gate circuit 8 are closed. The output signal of the shift register can therefore be represented by: 000...0.

The shift pulses for register 7 are supplied by the count pulse generator 6, having a counting frequency corresponding with the given division of the measuring range into range increments. The count pulse generator 6 is started and stopped by a signal supplied via conductor 14, the duration of which signal corresponds with the time in which the desired measuring range can be run through by a reflected pulse.

The shift pulses are supplied via inputs 13 to the flip-flops A, B, .... At the first pulse from the count pulse generator 6 the contents of register 7—still consisting of 0's—are shifted by one place, the flip-flop A changes its state of equilibrium and a pulse is produced through conductor a. The "AND"-gate A' of gate circuit 8 is opened for the duration of the latter pulse. The output signal of register 7 can then be represented by 100...00. At a second pulse from generator 6 the contents of register 7 are again shifted by one place, gate A' is closed and B' is opened. The output signal of register 7 can be represented by 010...00. At each shift pulse supplied by the generator 6, one of the "AND"-gates A', B',... is successively opened and closed. The time in which the "AND" gates are opened corresponds with the time in which a reflected pulse can cover a range increment which is determined by the count frequency and hence by the given division of the measuring range. After the whole measuring range has been covered, the last "AND"-gate Z' is closed and the count pulse generator 6 is stopped. The output signal of register 7 can again be represented by 000...00. If the radar aerial again transmits a pulse within the desired azimuth interval, the above-mentioned process is repeated; the "AND" gates of gate circuit 8 are successively opened and closed again.

Figure 4:
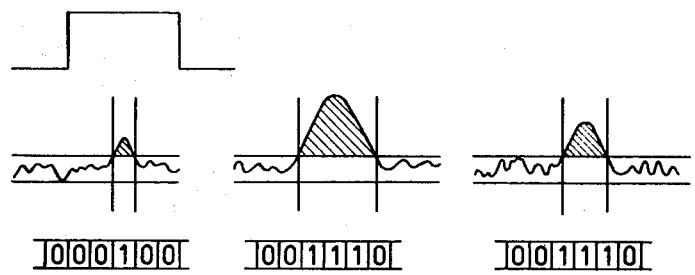
FIGS. 3, 4, 5 and 6 are diagrams for explaining the application illustrated in FIG. 1.

In the embodiment shown in FIG. 2 the range increments are all equal to each other and individually shorter than the duration of the transmitter pulse and hence the time in which each of the gates A', B', .... is opened is shorter than the duration of the transmitted pulse. Depending on the energy contents of the detected signals fed to quantizer 2 and on the choice of the threshold the received signals may now pass several successively opened gates. In such a case several storage elements of buffer register 3 are set i.e., several bits are written in the buffer register per video signal received. This is illustrated in FIG. 4. This figure shows on consecutive lines a transmitter pulse, three video signals and the corresponding parts of the buffer register. The energy contents of the first video signal are such that only one storage element of the buffer register is set; the energy contents of the second and third video signals are such that three storage elements are set.

The storage elements of the buffer register 3 are constituted by the flip-flops A'', B'', . . . The contents of the buffer register are taken over into the store of the computer 4 each time prior to the termination of a time interval corresponding to the listening time. After having taken over the data concerned the computer gives a signal which causes the flip-flops of the buffer register to return to their initial states.

Figure 5:
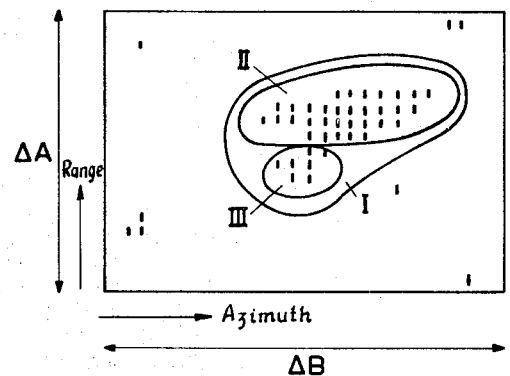

Then the bit array generally has the shape shown in FIG. 5. A target is no longer indicated by a single sequence of bits, but by a group (cloud) of bits. As a result of this refined display the resolving power is materially increased. This is illustrated in FIG. 5 by the bit cloud inside outlined region I, in which bit cloud two separate groups of bits may be discerned. The outlined region II indicates the group of bits representing the target to be tracked; the outlined region III indicates the bits of a second target or an interference. The real target position in range and azimuth is obtained by the selection of the group of bits associated with the target to be tracked from the total of bit positions and by logically processing the selected group of bits. It will be obvious that the arithmetic unit can be readily programmed for this purpose in a correct manner. In order to restrict the number of elements of shift register 7, gate circuit 8 and buffer register 3, the measuring range is minimized. For this purpose a tracking frame formed by a range and azimuth gate is used, which is held directed to the target to be tracked with the aid of a range and azimuth gate pulse generator. The range and azimuth gate pulse generator denoted by 15 and 16 in FIG. 1 is controlled by the computer 4. The gate pulses are fed to the range and azimuth gate circuit 17 in quantizer 2 via conductors 9 and 14.

Figure 6:
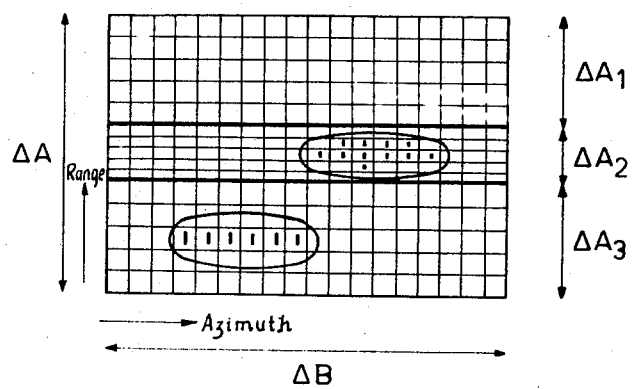

In the bit array shown in FIG. 6 the measuring range is divided into three zones $\Delta A_1$, $\Delta A_2$ and $\Delta A_3$. The range increments into which the identical zones $\Delta A_1$ and $\Delta A_3$ are divided exceed the duration of the transmitter pulse; the increments into which zone $\Delta A_2$ is divided are shorter than the duration of the transmitter pulse. A target located in zone $\Delta A_2$ is therefore represented by a bit cloud; a target located outside zone $\Delta A_2$ is represented by a single sequence of bits. This is illustrated in FIG. 6.

Figure 7:
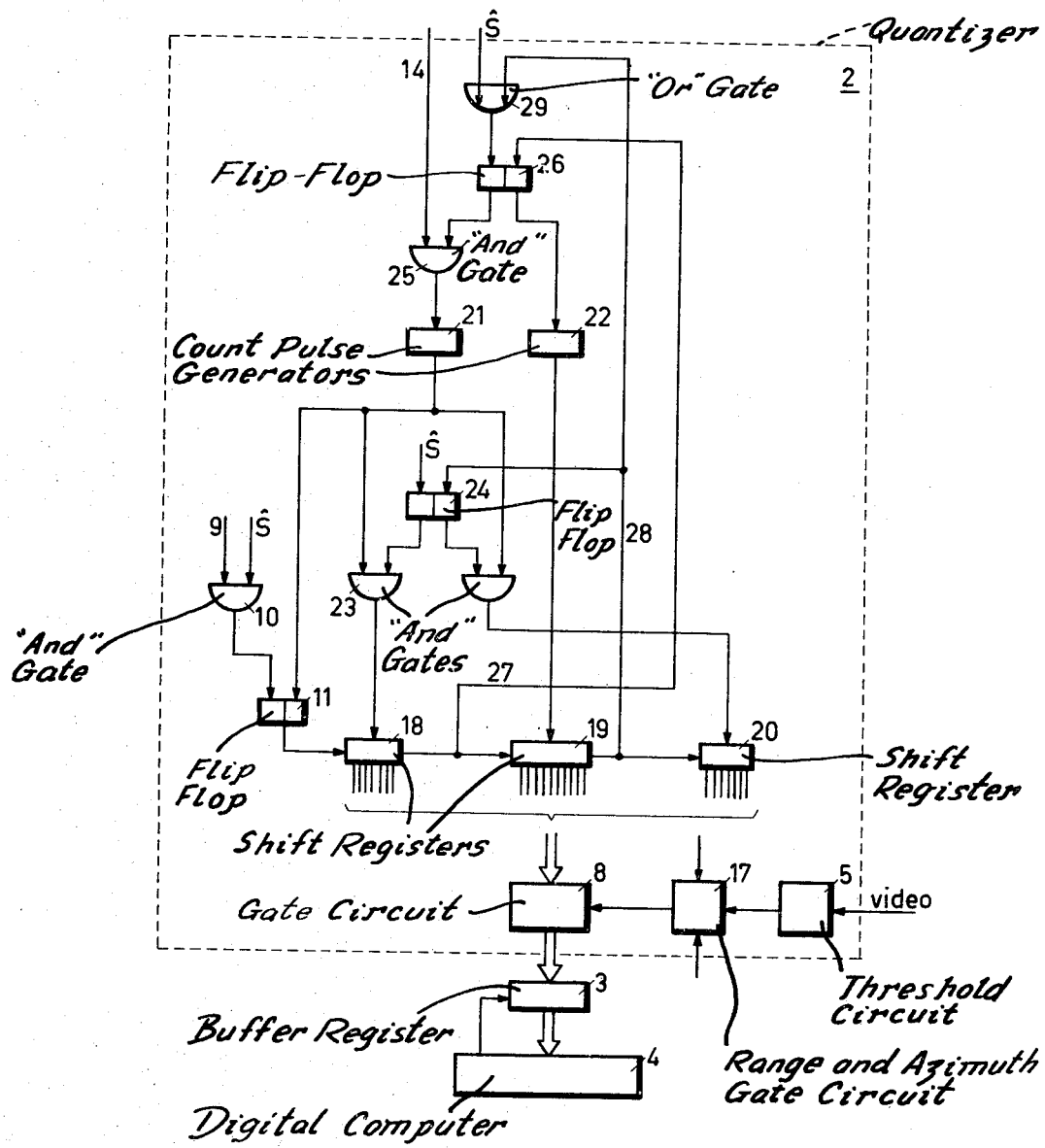
FIG. 7 shows a second embodiment of said device.

FIG. 7 shows an embodiment of the device according to the invention, in which the shift register of quantizer 2 comprises three parts 18, 19 and 20 corresponding with the aforesaid division of the measuring range into three zones. The quantizer comprises two count pulse generators 21 and 22, which have different counting frequencies so that the higher counting frequency, i.e., that of generator 22 corresponds to the division of zone $\Delta A_2$ into range increments, whereas the other counting frequency corresponds to the division of zones $\Delta A_1$ and $\Delta A_3$ into increments. Like in the embodiment of FIG. 2 the gate 10 remains open by a signal supplied through conductor 9 for the time in which the aerial covers the desired azimuth interval. The contents of shift registers 18, 19 and 20 are also fixed so that initially all "AND" gates of the gate circuit 8 are closed. Furthermore also in this case sync pulses S are fed to shift register 18 synchronously with the pulse repetition frequency via gate 10 and flip-flop 11.

If the count pulse generator 21 is started, shift pulses are fed to register 18 through "AND"-gate 23. Gate 23 is opened by sync pulse S through flip-flop 24. After all gates of gate circuit 8 connected to register 18 have been successively opened and closed, generator 21 is stopped and generator 22 is made operative.

Count pulse generator 21 is started by a signal fed through conductor 14 via an "AND"-gate 25, which is opened by a sync pulse S via flip-flop 26. Generator 21 is stopped, when the last "AND" gate connected to register 18 is closed, due to a signal being supplied through conductor 27, which causes flip-flop 26 to change its state, as a result of which gate 25 is closed. Owing to the changed state of flip-flop 26 count pulse generator 22 is started. All "AND" gates of gate circuit 8 connected to register 19 are then opened and closed in succession. Then flip-flop 26 returns to its initial state, by means of a signal supplied through conductor 28 and "OR"-gate 29. Count pulse generator 22 is stopped and count pulse generator 21 is rendered operative again through gate 25. Via "AND"-gate 30 the shift pulses are then fed to register 20, because the signal through conductor 28 has caused flip-flop 24 to change its state and to open gate 30. Also all "AND" gates of gate circuit 8, connected to register 20 are successively opened and closed. After the last gate has been closed, the whole measuring range has been covered and the signal across conductor 14 disappears. The count pulse generator 21 is stopped again via gate 25. If a pulse is transmitted again inside the azimuth interval, the process described above is repeated. This results in the bit array illustrated in FIG. 6.

Figure 8:
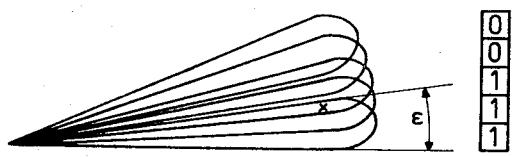
FIG. 8 shows a diagram for explaining a second application of the device according to the invention.

The embodiment of the device according to the invention is such that the possibility of use is not restricted to a search radar apparatus but also covers a three-dimensional radar system, in which range, azimuth and elevation can be accurately determined. If the device according to the invention is used in a radar apparatus of the kind described in U.S. Pat. application Ser. No. 865,609, filed Oct. 13, 1969, in which an elevation measuring scan is performed with the aid of a frequency-dependent aerial, immediately after each pulse transmitted by the search aerial, the signals supplied to the shift register come from the frequency control unit associated with said frequency-dependent aerial. The number of elements of the shift register, the gate circuit and the buffer register correspond with the number of frequency changes produced by the frequency control unit. Each frequency change corresponds to an elevation interval. The frequency differences are chosen so that the beams transmitted by the aerial overlap each other when simultaneously transmitted. FIG. 8 shows a number of overlapping beams and the associated column of the bit array, in which the target is represented by a plurality of bits corresponding to the number of beams in which the target is located.

What we claim is:

1. A device for making predictions and corrections in azimuth and in a second coordinate of a target to be tracked from video signals detected by a pulse radar apparatus, comprising a quantizer for transforming video signals into binary signals, a buffer register connected to said quantizer, and a digital computer connected to said buffer register, said buffer register being connected to write said binary signals from said quantizer into the store of said digital computer, the buffer register being divided into a plurality of storage elements corresponding to a given division of the measuring range of said second target coordinate, said computer determining the real position of the target to be tracked from the registered data, said quantizer comprising a count pulse generator having a reciprocal counting frequency determined by the size of the increments into which said measuring range is divided, said increments being shorter than the duration of the transmitter pulse of said pulse radar apparatus, a shift register connected to said count pulse generator, and a gate circuit connected to said shift register, said gate circuit comprising a plurality of "AND" gates, the number of said "AND" gates corresponding with the number of increments into which said measuring range is divided, said "AND" gates being opened and closed by pulses supplied by said shift register with a frequency corresponding with that of the count pulse generator to pass said video signals through those gates of said gate circuit, which are opened by the shift register for a time corresponding to the duration of said video signal, to said buffer register for writing a varying number of bits in said digital computer thereby obtaining the real position in azimuth and said second coordinate by the selection of the group of bits associated with the target to be tracked from the total of the position of said bits as written in the store of said digital computer during consecutive transmitter pulse intervals and by logically processing said group of bits.

2. A device as claimed in claim 1, further comprising a computer controlled azimuth and range gate, said gate forming a tracking frame directed to the target to be tracked and wherein the reciprocal frequency of said count pulse generator corresponds to the size of the range increments in which the range gate is divided, said quantizer further comprises a threshold circuit to which said video signals are supplied, the output signals of said threshold circuit being fed to said gate circuit via said azimuth and range gates, said gate circuit supplying for each video signal received within the range gate a plurality of bits in accordance with the ratio between the duration of the incoming video signals and the size of the range increments.

3. A device as claimed in claim 2, wherein said shift register comprises three parts corresponding to a division of the range gate into three zones, and wherein said quantizer further comprises a second count pulse generator whose counting frequency differs from that of the first count pulse generator, the higher counting frequency corresponding to the division of the central zone located around the predicted range into range increments, the lower counting frequency corresponding to the division of the other zones into range increments, said quantizer further comprising a logic circuit connected to each part of the shift-register and to both count pulse generators, said logic circuit causing the two count pulse generators to supply alternatively such a number of pulses for the shift register as corresponds to the number of range increments of the zone concerned.

* * * * *

PO-1050
(5/69)

UNITED STATES PATENT OFFICE
CERTIFICATE OF CORRECTION

Patent No. 3,646,588          Dated February 29, 1972

Inventor(s) YFTINUS FREDERIK VAN POPTA

It is certified that error appears in the above-identified patent and that said Letters Patent are hereby corrected as shown below:

On the Title page Section [30] heading "Foreign Application Priority Data" change "6814192" to --6814912--.

Signed and sealed this 29th day of August 1972.

(SEAL)
Attest:

EDWARD M. FLETCHER, JR.  
Attesting Officer

ROBERT GOTTSCHALK  
Commissioner of Patents